US006792400B2

(12) United States Patent
Alden et al.

(10) Patent No.: US 6,792,400 B2
(45) Date of Patent: Sep. 14, 2004

(54) VISUALIZATION OF COMPLEX SYSTEM INTERACTIONS

(75) Inventors: Jeffrey Morgan Alden, Ann Arbor, MI (US); Daniel J. Reaume, Livonia, MI (US)

(73) Assignee: General Motors Corporation, Detroit, MI (US)

( * ) Notice: Subject to any disclaimer, the term of this patent is extended or adjusted under 35 U.S.C. 154(b) by 814 days.

(21) Appl. No.: 09/740,583

(22) Filed: Dec. 18, 2000

(65) Prior Publication Data

US 2002/0075270 A1 Jun. 20, 2002

(51) Int. Cl.[7] .............................................. G06F 5/00
(52) U.S. Cl. ........................................ 703/2; 345/420
(58) Field of Search ............................ 703/2; 700/104, 700/118; 345/420, 763

(56) References Cited

U.S. PATENT DOCUMENTS

| | | | | |
|---|---|---|---|---|
| 5,251,290 A | * | 10/1993 | Pabon | 345/420 |
| 5,617,321 A | * | 4/1997 | Frizelle et al. | 700/104 |
| 5,999,185 A | * | 12/1999 | Kato et al. | 345/420 |
| 6,714,936 B1 | * | 3/2004 | Nevin, III | 707/102 |

OTHER PUBLICATIONS

Sajaniemi, "Modeling Spreadsheet Audit: A Rigorous Approach to Automatic Visualization," *Journal of Visual Languages and Computing* (2000) 11, pp. 49–82.

Butler, "EUSPRIG The Subversive Spreadsheet," Information Integrity Research Centre, Jul. 6, 2000, pp. 1–4. Available online: http://www.gre.ac.uk/~cd02/EUSPRIG/Ray Butler1.htm.

Davis, "Tools for Speadsheet Auditing," *Int. J. Human-Computer Studies* (1996) 45, pp. 429–442.

* cited by examiner

*Primary Examiner*—Albert W. Paladini
(74) *Attorney, Agent, or Firm*—Kathryn A. Marra

(57) ABSTRACT

A data analysis tool that provides a technique for visualizing changes of a system model. The analysis tool includes constructing an influence diagram consisting of a series of calculation entities and data entities interconnected by arrows, where the entities correspond to parameters of a system model being analyzed. Input values are assigned to each of the data entities for a particular scenario, and the corresponding values are computed for the calculation entities. A new scenario is implemented by changing one or more of the input values to the data entities, thus providing different results for some or all of the calculation entities. A mathematical function is applied to each entity to modify its appearance based on the values of the entities for current or other scenarios. Changes to each entity from the input of the new scenario can be in a variety of forms, such as size of the entity, color of the entity, shading of the entity, etc. Additionally, the arrows that connect the various entities can also be modified in appearance based on the new values of the entities for the new scenario. A rapid replay of the sequence of diagrams so generated provides a useful visual animating of system response to changing inputs and assists in controlling and improving the system under study.

29 Claims, 6 Drawing Sheets

VISUALIZATION OF COMPLEX SYSTEM INTERACTIONS

TECHNICAL FIELD

This invention relates generally to a method of visually displaying changes to a system model and, more particularly, to a data analysis system and method that visually displays the consequences of changes in the input data of a system model by changing the attributes (e.g., size, color, image, border, etc.) of entities in an influence diagram depicting the system model.

BACKGROUND OF THE INVENTION

It is often desirable to visually display data relating to a system or procedure so that a user can readily discern information therefrom. The benefits of providing visualization for system analysis includes cross-functional understanding of system relationships and intuitive communication of results, faster model validation, and higher acceptance of system models. For example, it may be desirable to determine what factors affect the profits from sales of a particular product, and how each factor affects other factors that are used to determine profit. Different systems and protocols exist in the art for visually displaying information. For example, products such as Visio from Microsoft and Analytica from Lumina Decision Systems offer examples of displaying data in various manners that allow a user to visually perceive such information.

One known technique for displaying information is by influence diagrams. An influence diagram is a graphical display that describes a system or operation as a series of images (bubbles, nodes, etc.) interconnected by arrows. FIG. 1 is an example of a simple influence diagram 10 that shows that profits are influenced by revenues and costs. Particularly, diagram 10 shows that an entity labeled profits 12 is directly related to an entity labeled revenues 14 and an entity labeled costs 16 by connecting arcs 18. The known influence diagrams may be useful for depicting influences, but they do not by themselves reveal the magnitude of influences.

Known systems analysis tools typically take input data, process it, and generate output. These known approaches, however, conceal the intermediate steps of the process and do not reveal most system interactions and dependencies. It would be desirable to provide a process that converts raw system information into useful quantities, and also visually and dynamically depicts the magnitude and importance of the system interactions that underlie the computation of the useful quantities. Such a depiction would allow for wider use of the process for more complex systems, and provide critical feedback to better control the system.

Many known system models are complex, having thousands of variables, inputs and time consuming intermediate calculations. Developing and debugging such models usually requires the study and analysis of smaller portions or sub-models of the entire model to provide a "divide and conquer" approach to the overall system. Typically, this is a tedious and time-consuming task because a full data set must be specified and entered for the entire model, and all calculations must be performed (often with computer compilation) to study each sub-model that is identified. Moreover, it is very difficult to study the behavior of a specific sub-model under specified conditions (e.g., run a particular test), if the sub-model depends on values that are not entered as data, but are provided through intermediate calculations inside the full model. In other words, it is difficult to determine the response of a specific sub-model because the inputs to that sub-model may depend on the behavior of other sub-models outside of the specific sub-model.

Data spreadsheets provide one known technique for entering and processing data. However, between 40% and 80% of spreadsheets contain errors at their inception, and up to 30% of operational spreadsheets contain errors. The main cause of many such errors is the invisibility of spreadsheet calculations. In other words, it is impossible, at first glance, to determine whether a spreadsheet cell contains a number or a formula, and whether any other cells depend on that particular spreadsheet cell. Several spreadsheet-auditing tools have been developed to assist users by overlaying a graphical representation of calculation logic on top of spreadsheets. This is a big step forward in terms of auditing, but these techniques do not address the fundamental difficulties inherent in the initial design and later modification of the spreadsheet.

A visual modeling product exists in the art called DPL, available from Price-Waterhouse-Coopers, that manages the visible representations of spreadsheets. DPL has a rudimentary capability to convert simple spreadsheets into visual models. However, DPL cannot convert complex spreadsheets into visual representations, manage this representation, and maintain equivalence with the original spreadsheet.

What is needed is a data analysis tool that allows an immediate visual response of the parameters of a system model, including intermediary calculations, after a change in the input data of the model. It is, therefore, an object of the present invention to provide such a data analysis tool.

SUMMARY OF THE INVENTION

In accordance with the teachings of the present invention, a data analysis tool is disclosed that provides a technique for visualizing changes of a system model. The analysis tool includes constructing an influence diagram consisting of a series of calculation entities and data entities interconnected by arrows, where the entities correspond to parameters of the system model being analyzed. Input values are assigned to each of the data entities for a particular scenario, and the corresponding values are computed for the calculation entities. To provide ease of analysis, multiple values assigned to a single entity can be converted to a single aggregate value, such as an average value.

A new scenario is implemented by changing one or more of the input values to the data entities, thus providing different results for some or all of the calculation entities. A mathematical function is applied to each entity to modify its appearance based on the resulting values of the entities for the current and possibly other scenarios. For example, the change in magnitude of a certain entity can be shown by the size of the entity for the new scenario. Changes to each entity from the input of the new scenario can be, however, in a variety of forms, such as size of the entity, color of the entity, shading of the entity, etc. Additionally, the arrows that connect the various entities can also be modified in appearance based on the new values of the entities for the new scenario.

Additional objects, features and advantages of the present invention will become apparent from the following description and appended claims, taken in conjunction with the accompanying drawings.

DESCRIPTION OF THE PREFERRED EMBODIMENT

The following discussion of the preferred embodiments directed to a data analysis tool for visualizing complex system interactions is merely exemplary in nature, and is in no way intended to limit the invention or its applications or uses.

Any system model can be defined by an influence diagram that is constructed out of two types of entities or abstract objects, where each entity consists of one or more values. The first type of entity is referred to herein as a data entity and has a given data value or values. The second type of entity is referred to herein as a calculation entity and has a formula associated with it that calculates an output based on input data. The values or outputs of the calculation entities are calculated as a function of the values of other entities, including data entities and/or other calculation entities. Arcs (arrows) are used to show what other entities a calculation entity directly depends upon. One entity is said to depend on and is connected to another entity if there is a sequence of directly dependent entities beginning with the one entity that includes the other entity. An output calculation entity receives inputs from other entities, but has no other entity depending on it.

Figure 1:
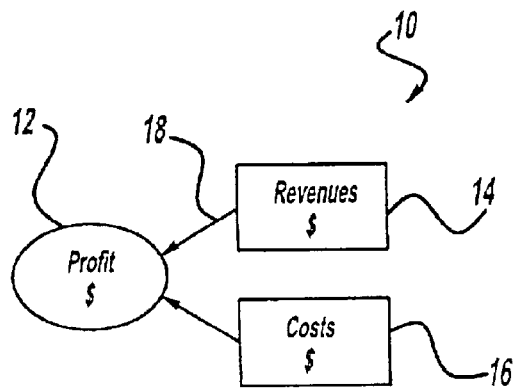
FIG. 1 is a representation of a simple influence diagram.
Figure 2:
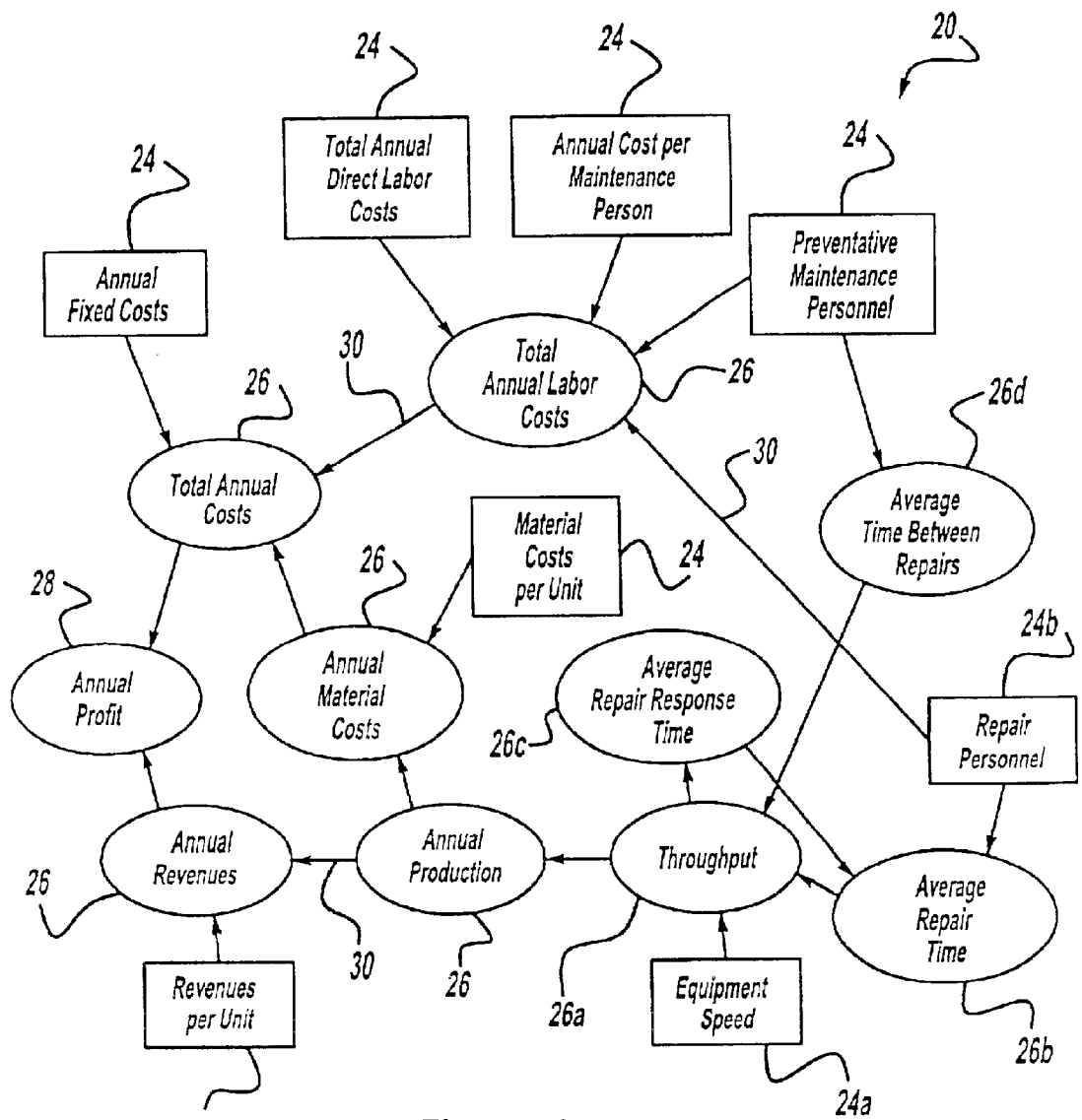
FIG. 2 is a detail influence diagram for maintenance planning employing both oval calculation entities and rectangular data entities, according to an embodiment of the present invention.

FIG. 2 is an influence diagram 20 including a plurality of entities that combine to form a model for maintenance planning in a plant. The data entities have a rectangular shape and are labeled with reference numeral 24. The calculation entities have an oval shape and are labeled with reference numeral 26. This is by way of a non-limiting example in that any shape can be used to distinguish calculation entities and data entities. Each calculation entity 26 includes a formula for calculating an output from the received data from other predetermined entities as distinguished by arcs 30. An annual profit calculation entity 28 is an output entity that calculates the annual profits based on all of the input data from the data entities 24 and the calculations made by the calculation entities 26.

The influence diagram 20 illustrates a simple model for allocating maintenance resources in a plant, and is provided as an example to demonstrate the usefulness of visualizing system model responses to changes in inputs, according to the invention. In this model, preventative personnel diagnose and fix problems before equipment breaks and repair personnel work to fix equipment that has failed. The more preventative maintenance personnel available, the greater the average time between failures. The more repair personnel available, the shorter the time to repair failures. The number of units that can be produced by the plant, its throughput, depends on the speed of the equipment, how often it breaks and how quickly it can be repaired. Greater throughput increases annual production, thus increasing total revenues, but also increasing the costs of consumed materials. Greater throughput also increases wear and tear on the equipment, increasing the repair response time as repair crews are busier. The average repair time includes both response time and time to actually perform the repair. Other costs include fixed costs and labor costs, which in turn includes direct labor costs and maintenance labor costs. Subtracting costs from revenues yields annual profit.

Note that some calculation entities 26 depend on themselves. For example, the "Throughput" entity 26a depends on the "Average Repair Time" entity 26b which depends on the "Average Repair Response Time" entity 26c which depends on the "Throughput" entity 26a. Such computational cycles are not errors in model design, and are essential to accurately model feedback systems. To compute the values of the calculation entities 26 in this cycle, a value is initially set for at least one of the entities. Values for the remaining entries in the cycle may then be calculated via some analysis approach, such as a functional iteration. A start indicator (not shown) may be used to determine which entity on a cycle is initialized with a starting value(s).

According to one embodiment of the present invention, changes to the various entities in the influence diagram 20 are analyzed by viewing how the entities change in response to a change in input data or other factors. According to the invention, a change in data affects the appearance of the influence diagram. An algorithm is employed to establish a suitable influence diagram of the model, and then the algorithm makes adjustments to the influence diagram depending on data changes, so that changes in the various entities can be visually monitored.

Figure 3:
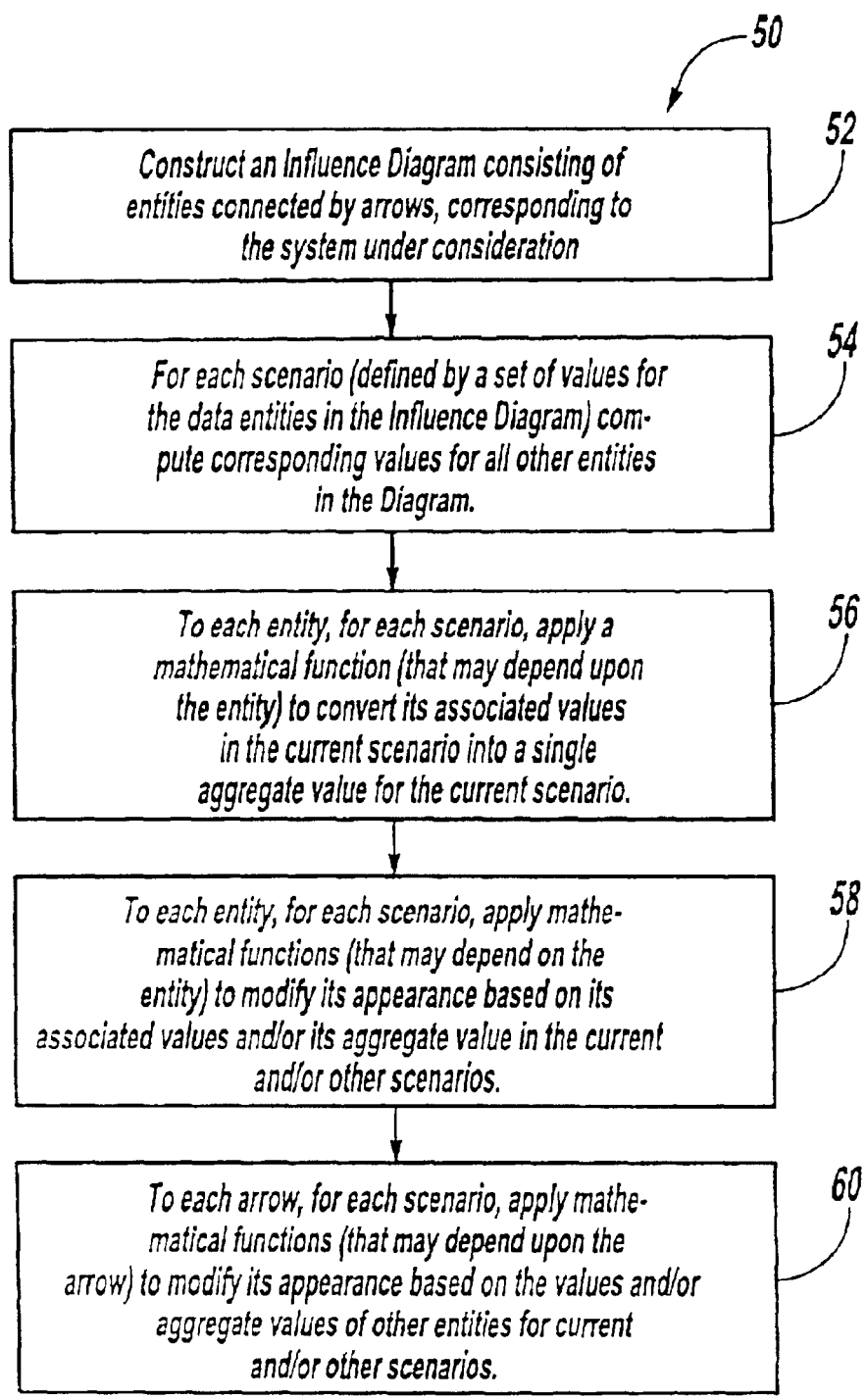
FIG. 3 is a flow chart diagram showing a process for the visualization of a complex system interaction, according to an embodiment of the present invention.

FIG. 3 is a flow chart diagram 50 showing the steps of the algorithm that provide the ability to visualize complex system interactions, according to the invention. The algorithm generates an influence diagram, and can be in any suitable computer language or protocol, as would be readily apparent to those skilled in the art. Further, many different styles and techniques can be written in the code to achieve the desired features of the present invention, as discussed herein. The algorithm first constructs an influence diagram of the type referred to above, as represented by box 52. The step of box 52 includes identifying one or more sets of values for each data entity 24 generated. Further, this step also includes identifying a description of the system interactions between entities by equations, computer code, etc. The person generating the influence diagram 20 would determine all the various factors and inputs that go into determining the maintenance planning model.

The step of box 54 includes computing the values for the calculation entities 26 in the influence diagram 20, and may include for each set of input values, applying system direction information to compute values for all intermediate and output calculation entities. This step may require solving a system of simultaneous equations. For example, the step of box 54 may identify annual sales as the sum of all monthly sales data.

Box 56 shows the step of using a mathematical function to convert the associated values of each calculation entity 26 for a current scenario into a single aggregate value for that scenario. Multiple values may be associated with an entity. This step allows those values to be combined as a single value, such as an average, by providing a user-specified mathematical function to convert the values associated with each entity into a single numerical value. For example, average monthly sales may be assigned as an aggregate value for a monthly sales entity. This step is optional in that the particular scenario being processed may not require such a simplification of the various entities. This step is meant to simplify the analysis so that a user can more readily discern the desired information therefrom.

The step represented by box 58 includes modifying the appearance of each entity based on its value and/or aggregate value in the current and/or other scenarios. This step includes employing the algorithm to modify the appearance (e.g., size, color, shape, shading, etc.) of each affected entity according to a user-specified mathematical function. For example, the size of an entity might be proportional to another entity, or it might denote the relative change in an entity between two consecutive sets of input entity values. In one example, the size of the entity is proportional to the magnitude of change between the values associated with a current scenario and the values associated with a previous scenario. In other words, the size of an entity after new data is processed shows how that entity will change as compared to previous data.

The step of box 60 represents modifying the appearance of each arrow in the influence diagram based on the values and/or aggregate values of other entities for a current and/or other scenarios. Particularly, the arrows in the influence diagram are modified in appearance (e.g., size, color, shading, etc.) based on the user-specified mathematical function of the value of the entities in the diagram. For example, the width of the arrow might be proportional to the value of an entity at the end of the arrow. Or, the width of a selected arrow may be proportional to the change in the value of the entity connected at its head times the change in the entity connected at its tail. The step of box 60 also includes storing and/or explaining the resulting influence diagram for each set of input values.

The resulting diagrams for each set of input values may be viewed individually or rapidly in a sequence, simulating an animated movie. Such diagrams are extremely practical and provide useful depictions of system relationships and response to input changes. Changes in the entities caused by a change in input data are indicated, for example, by an increase in entity size, where the color of the entity indicates whether the change corresponds to an increase or decrease in value. Several such diagrams displayed in sequence serve to highlight via animation the dynamics underlying system response to employee transfer. This particular diagram is useful for business case support, for allocating employees, and for preparing the system to deal with the proposed transfer.

Figure 4:
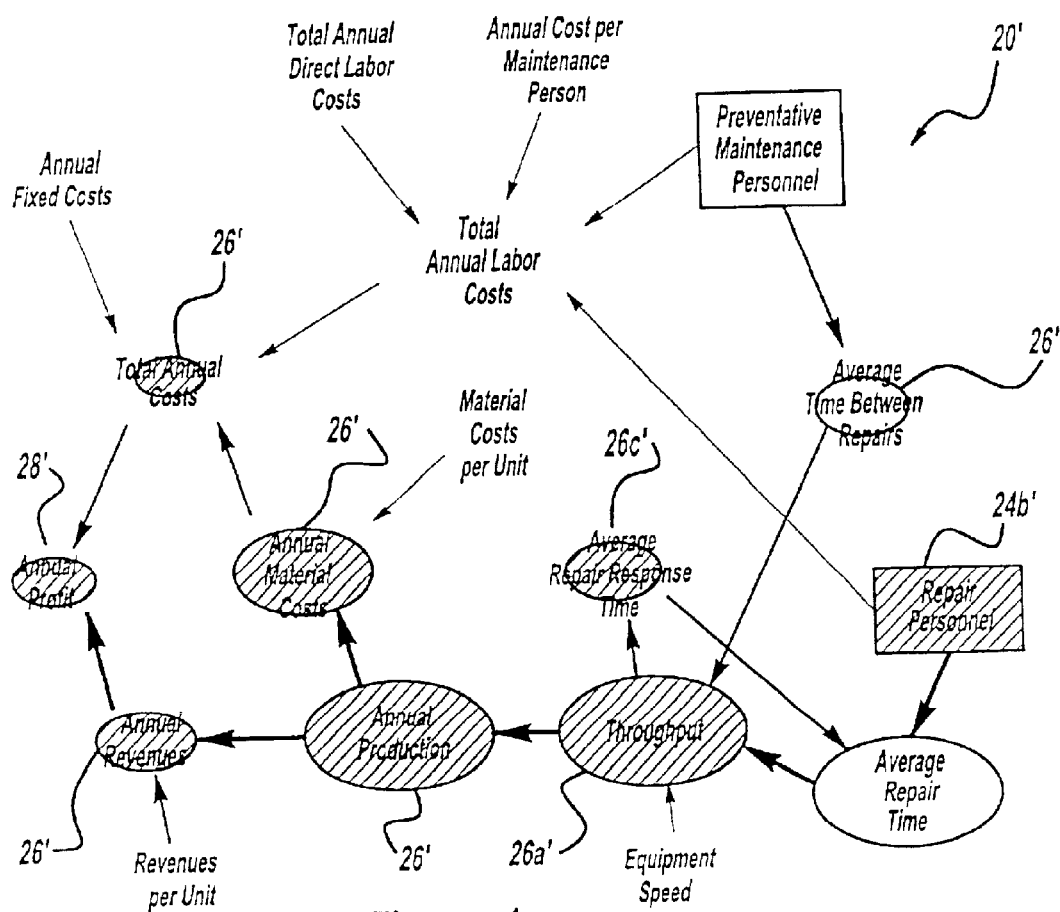
FIG. 4 is a depiction of the influence diagram shown in FIG. 2 after a data change has been made, according to the invention.

A critical tradeoff in planning plant operations is the allocation of maintenance personnel between preventative maintenance and repair duties. The question might be posed, "Do profits increase if I transfer three people from repair to preventative maintenance duties?" FIG. 4 is an influence diagram 20' after a change is made to answer this question, and how that change affects the entities in accordance with the algorithm discussed above. As is apparent, the size of some of the entities change as well as the thickness of the arcs, and the color of the entities (represented herein by shading). The size of the entities in the influence diagram 20' relative to the influence diagram 20 shows the magnitude of change based on the new input. The greater the magnitude of change, the bigger the entity is in diagram 20'. A white entity represents a positive change, and a shaded entity represents a negative change. Those entities that don't have boxes or ovals in the influence diagram 20' are unchanged from the diagram 20. Thus, the difference between the influence diagram 20' shown in FIG. 4 and the influence diagram 20 shown in FIG. 2 represents how the process of the present invention allows a detailed and readily apparent change to be easily visualized.

In this visualization, the size and shape of the entity indicates the magnitude of any change in value. If a shape decreases in value, it is shaded, otherwise it white. The width of each arrow is proportional to the impact a change in the entity at the tail of the arrow has of the entity at the head of the arrow. From this visualization, it can be seen that the total labor costs are unchanged as personnel are simply transferred internally. Also, increasing personnel for preventive maintenance somewhat increases the average time between failures. Decreasing personnel for repairs significantly increases the average time to prepare a failure. As the increase in the average time between failures has less impact on throughput than does the average time to repair a failure, the net impact of the personnel transfer of throughput is a reduction. Reduced throughput slightly reduces the response time of repair crews, but not enough to significantly moderate the overall increase in the average time to repair a failure. Reduced throughput reduces production, and hence material costs, total costs, revenues and profits.

A plurality of changes to the data of the entities can be provided, where each change in data provides a different influence diagram. The series of influence diagrams can be replayed as a sequence of diagrams to provide a useful animation of system response to changes in inputs, and assist in controlling and improving the system under study. In other words, a "movie" of the changes to the influence diagram 20 can be provided based on a series of changes to the entities to show how these changes occur over time.

According to another embodiment of the present invention, an influence diagram of a full system model is separated into smaller subparts or sub-models to more readily understand the operation of the overall system, and to isolate particular operations therein. For example, it may be desirable to separate as a sub-model the part of the process that determines throughput in the maintenance planning model represented by the influence diagram 20 as a sub-model.

Figure 5:
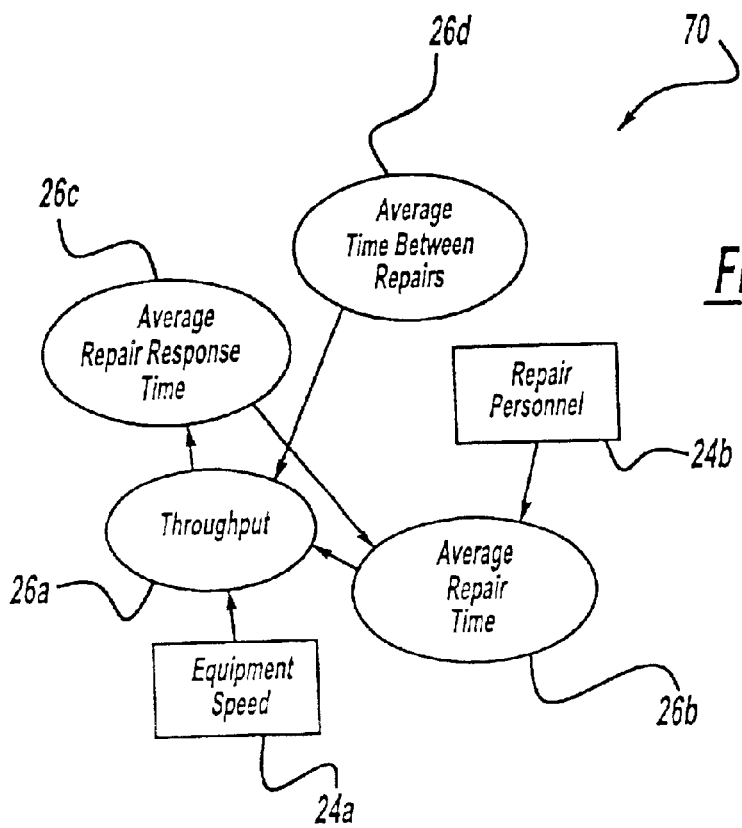
FIG. 5 is an influence diagram of a sub-model of the influence diagram shown in FIG. 2 that isolates throughput.

FIG. 5 shows a sub-model influence diagram 70 of the influence diagram 20 that includes the throughput entity 26a, the average repair time calculation entity 26b, the average repair response time calculation entity 26c, the average time between repairs calculation entity 26d, an equipment speed data entity 24a and a repair person data entity 24b. The sub-model influence diagram 70 allows the throughput entity 26a to be isolated, and visualized separately from the full system model. This may be particularly important for more complex systems. The present invention provides a technique for separating the sub-model 70 from the influence diagram 20, and making certain changes thereto so that it can be isolated and analyzed separately. According to the invention, any sub-model can be separated from a full model consistent with the discussion herein.

Figure 6:
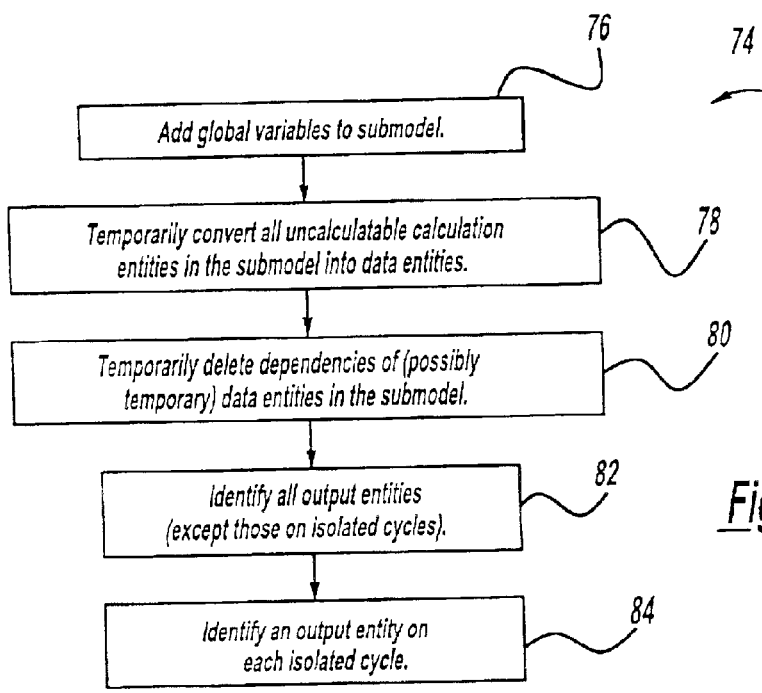
FIG. 6 is a flow chart diagram showing a process for analyzing sub-models of a full model, according to another embodiment of the present invention.

FIG. 6 is a flow chart diagram 74 showing how an algorithm of the present invention is used to analyze a sub-model of a full system model. As above, any suitable computer code and language can be employed to perform the algorithm of the present invention discussed herein, as would be appreciated by those skilled in the art. First, the desired sub-model, here sub-model 70, is separated from the full model by a user that desires to view only the sub-model. The step of box 76 includes adding global variables to the sub-model. Global variables are those values that may be used at various locations throughout the full system model (such as a constant interest rate) that are not particularly shown as input to a calculation entity in the full model. In other words, a calculation entity that is in the sub-model may require an input variable that is not shown as a particular input to that calculation entity. These global variables are added as needed to the sub-model by the algorithm.

The step of box 78 includes converting all calculation entities depending on one or more entities not in the sub-model 70 into temporary data entities. In other words, if not all of the entities on which a particular entity depends are included in the sub-model, then the algorithm converts the particular entity into a temporary data entity. This is necessary because if a particular calculation entity receives an input from an entity not in the sub-model, then it would not be possible to keep this entity as a calculation entity in the sub-model because it would not have the necessary input. Therefore, it is converted to a temporary data entity, and is assigned a suitable data value consistent with the particular analysis being observed.

Next, the algorithm temporarily deletes the dependencies of temporary data entities on other data entities, as represented by the step of box 80. Because some of the calculation entities may have been converted to temporary data entities, these temporary data entities may depend on other data entities that provided the inputs to the prior calculation entity. Thus, the data entities from which the temporary data entities depend are deleted. This is an important step because a calculation entity that has been converted to a temporary data entity in the sub-model can't depend on another data entity because it is now a data entity itself.

The next step is to identify all of the output entities in the sub-model 70, as represented by box 82. The step of box 82 determines all of the output entities in the sub-model 70 that are not in an isolated cycle. The algorithm does this by determining which calculation entities in the sub-model 70 do not have outputs to other entities. In other words, if no entity depends on a particular entity, then it is an output entity and is used to analyze the information of the sub-model 70.

As discussed above, isolated cycles are those cycles where each entity in the cycle depends on another entity in the cycle, but no output entity depends on any entity in the cycle. The algorithm goes through a process of identifying all of the isolated cycles in the sub-model. According to the invention, one of the entities in each detected isolated cycle is selected as an output entity. The algorithm arbitrarily selects a particular entity in the isolated cycle as the output entity for that cycle. Next, the algorithm systematically checks off each of the other entities in the isolated cycle to remove those entities as being possible output entities. Once all the entities in the sub-model 70 are identified, data is assigned to all of the data entities, including temporary data entities, and the sub-model is analyzed by submitting it to the system analysis algorithm.

Figure 7:
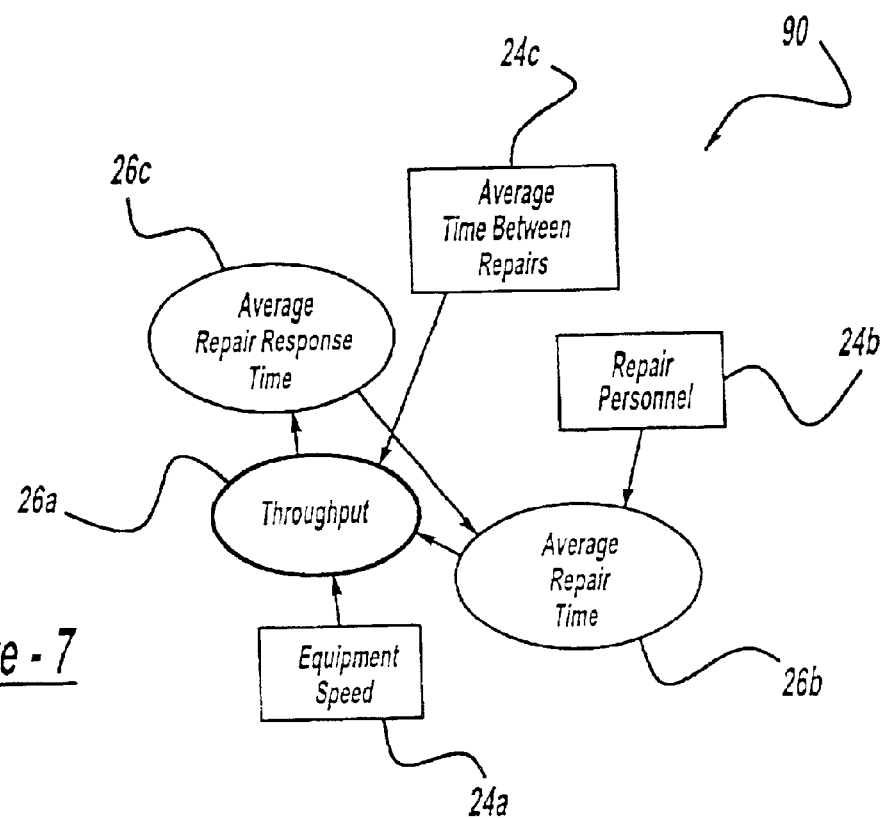
FIG. 7 is the influence diagram shown in FIG. 5 where certain of the calculation entities have been converted to data entities for the sub-model calculations.

FIG. 7 shows a sub-model 90 after it has been modified by the algorithm to allow independent analysis. The throughput calculation entity 26a is now an output entity (denoted here by a thick border), and the average time between repairs calculations entity 24c is a temporary data entity. After the sub-model 90 has been modified, data is assigned to all of the data entities and the temporary data entities, and a sub-model is analyzed by submitting it to the system analysis algorithm.

According to another embodiment of the present invention, a process is provided that creates and automatically maintains an equivalence between a spreadsheet and a functional visual representation of the spreadsheet, such as an influence diagram. The visual representation is not just a drawing, but is a functional equivalent to the spreadsheet it represents. According to this embodiment of the present invention, one or more entries in the spreadsheet includes a corresponding entity in the influence diagram, and each calculation entity in the influence diagram receives arrows from all of those data entries that are used as inputs for the particular calculation. The algorithm analyzes the spreadsheet, and generates a corresponding calculation entity and data entity for each process and data entry into the spreadsheet to generate the representative influence diagram. Additionally, the algorithm used to generate the influence diagram is capable of automatically adding and deleting entities in the influence diagram as changes are made to the spreadsheet.

Figure 8:
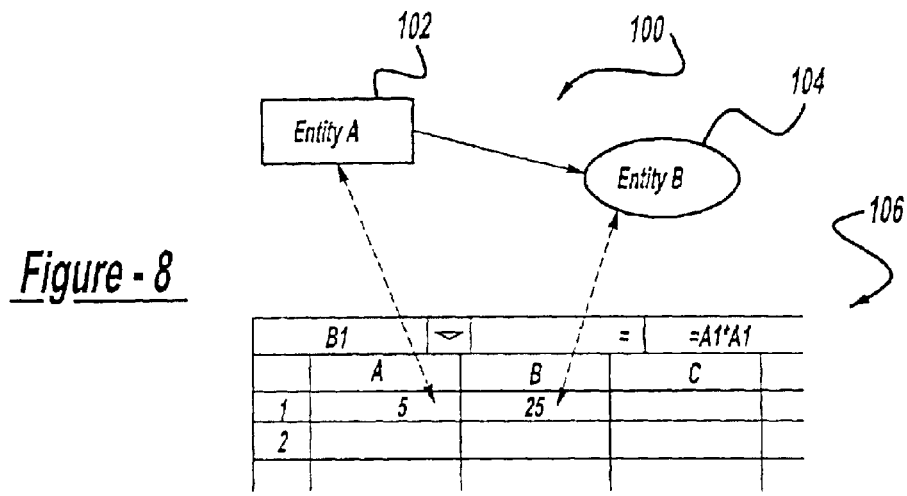
FIG. 8 is a simplified diagram showing the relationship between an influence diagram and a spreadsheet, according to the invention.

FIG. 8 shows a general depiction of an influence diagram 100, including a data entity 102 and a calculation entity 104, and a spreadsheet 106. In this example, the spreadsheet is Microsoft Excel, but as will be appreciated by those skilled in the art, other spreadsheets can also be visually represented within the scope of the present invention. The data entity 102 is directly related to a specific value in the spreadsheet 106 and the calculation entity 104 performs a mathematical function on the data, as shown by the dotted lines. Particularly, the data entity 102 represents the value 5 at line 1, column A of the spreadsheet 106, and the calculation entity 104 is the formula A1*A1 which gives the value 25 in line 1, column B of the spreadsheet 106.

Figure 9:
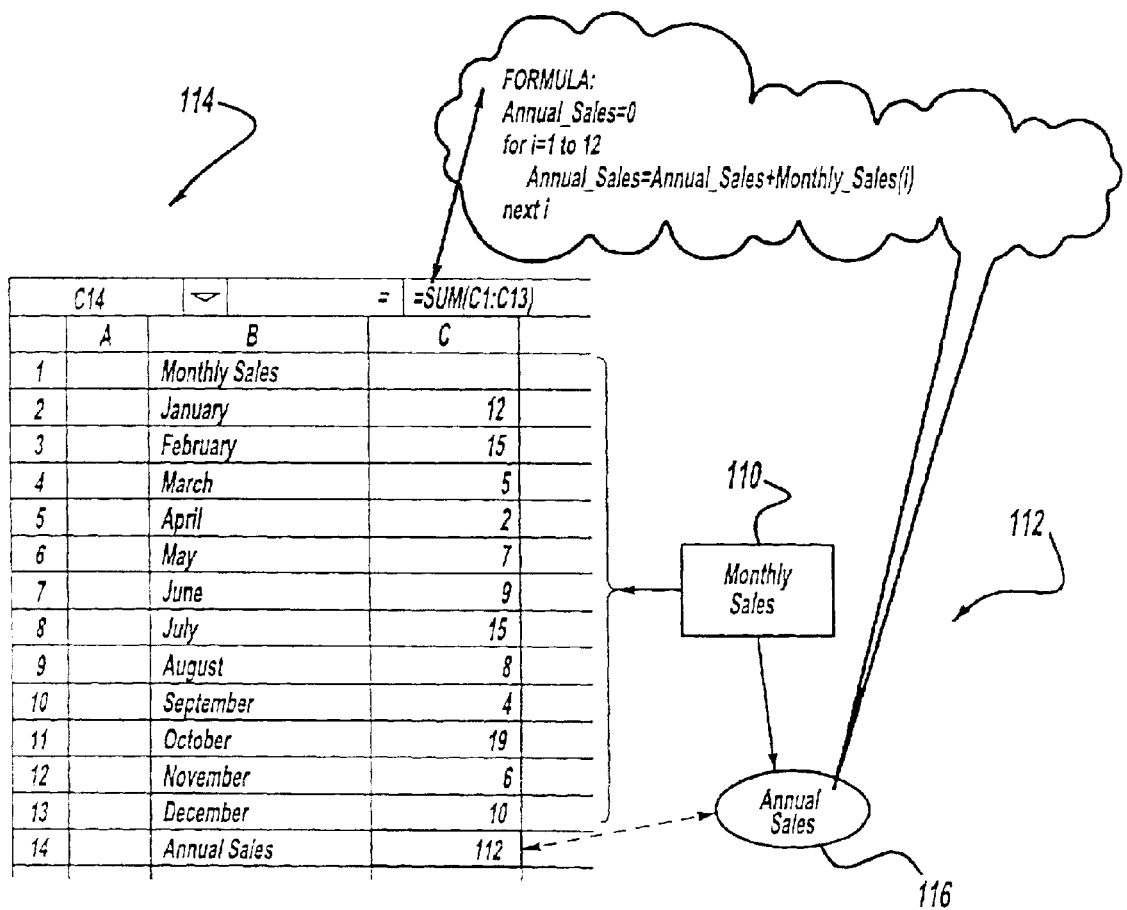
FIG. 9 is a diagram showing the connection between an influence diagram and a spreadsheet, according to the invention.

FIG. 9 shows another influence diagram and spreadsheet relationship where a data entity 110 in an influence diagram 112 represents the sales for each month of a calendar year entered into a spreadsheet 114. A calculation entity 116, labeled annual sales, has a formula that provides the summation of all of the data entries in the data entity 110. This figure shows that an entity in the influence diagram can include a plurality of spreadsheet entries.

Figure 10:
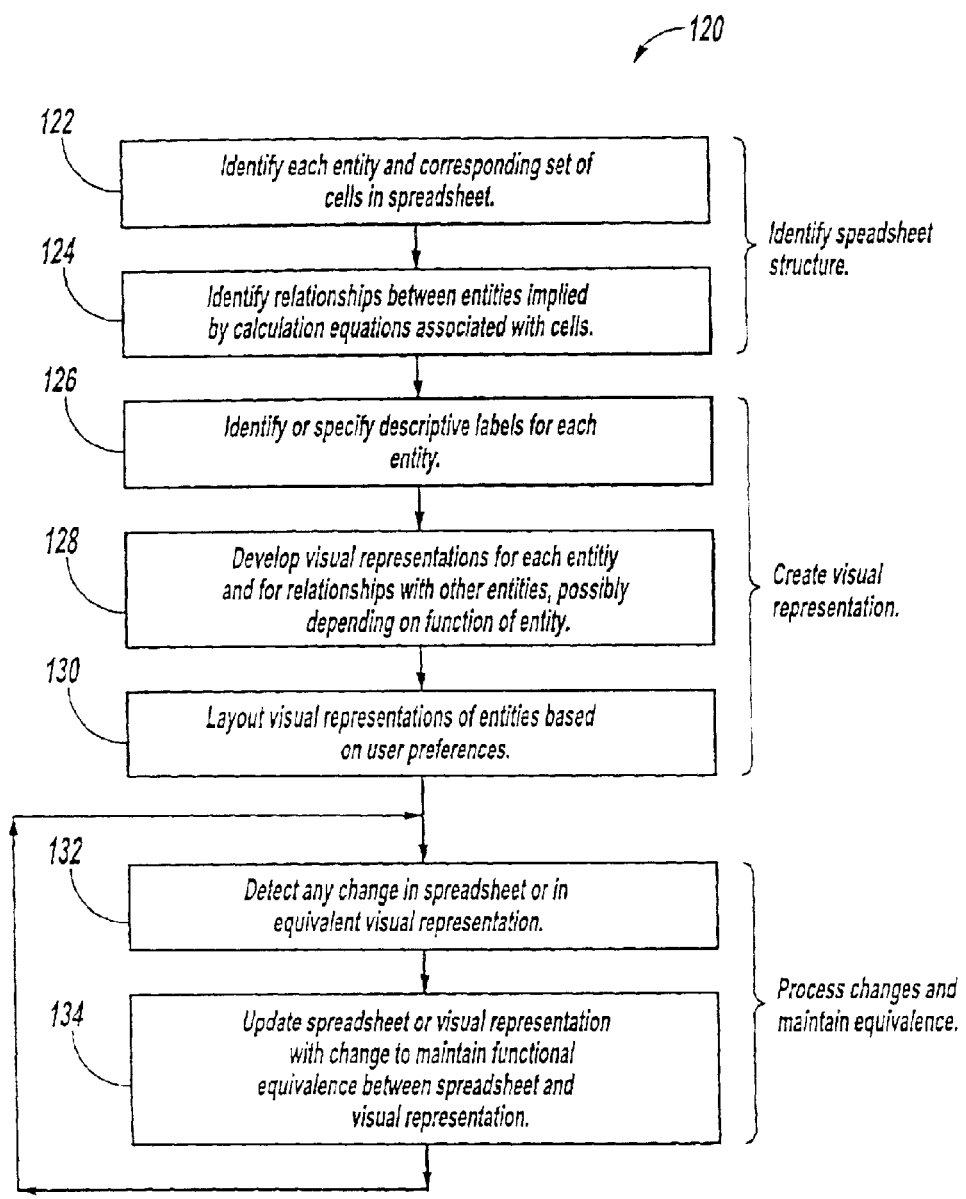
FIG. 10 is a flow chart diagram showing a process for the functional visualization of spreadsheets, according to another embodiment of the present invention.

FIG. 10 is a flow diagram 120 depicting the algorithm for this embodiment of the present invention, including providing a functional visualization of a spreadsheet. As with the algorithms discussed above for the other embodiments of the present invention, the algorithm for the flow diagram 120 can also be generated by any suitable computer code or computer language as would be appreciated by those skilled in the art. The flow diagram 120 includes a first step, represented at box 122, including identifying each entity in an influence diagram and the corresponding cells in the spreadsheet. This step includes constructing the logical entities required in the influence diagram from a visual or automated inspection of the spreadsheet. In other words, the algorithm will inspect the spreadsheet, and from that inspection determine what entities need to be included in the influence diagram, and the type of entity.

After each entity in the influence diagram is identified, the next step is to identify relationships between the entities provided by the equations associated with the cells in the spreadsheet, as identified at box 124. In other words, this step includes determining how the various identified entities in the influence diagram will be connected by the arrows.

The next three steps of the algorithm include actually creating a visual representation of the spreadsheet, i.e., the influence diagram, from the inspection of the spreadsheet. Box 126 represents the step of specifying descriptive labels for each entity already identified based on its operation. Once each of the entities are labeled, it is necessary to provide a specific visual appearance of each entity, based on the function of the entity, as identified by the step of box 128. Predefined defaults or user interactions can be used to specify the specific appearance of each entity in the influence diagram based on its function and/or other characteristics. For example, as discussed above, calculation entities are made oval shaped and data entry entities are made rectangular shaped. However, it is stressed that this is by way of example in that any particular attribute (shape, color, border, style, image, etc.) can be used to distinguish different types of entities from one another.

Figure 11:
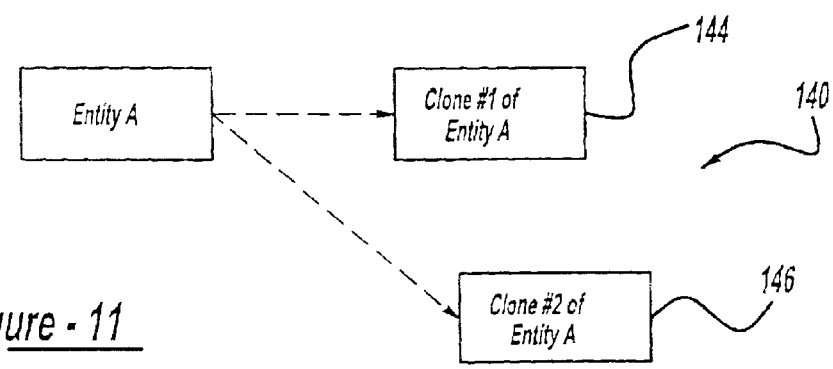
FIG. 11 is a block diagram showing cloning of a particular calculation entity for multiple uses within an influence diagram.

The next step at box 130 includes developing the visual layout of the entities after their appearance has been determined. This step includes providing a layout of the entities in the influence diagram based on user preferences, aesthetics, appearances, etc. The step of providing the visual layout of the entities can be performed by user-interaction and/or an automatic graph layout algorithm available in the art. For example, entities in the influence diagram can be cloned to make the visual representation more pleasing. FIG. 11 shows an influence diagram 140 including a parent data entity 142. Because spreadsheets sometimes use the same data for different locations in the spreadsheet, it may be necessary to "clone" a particular entity in the influence diagram, as represented here by clone entities 144 and 146. If any entity is "cloned" to create an identical entity to make the visual representation more pleasing, the cloned entity is not associated to any cells and is assigned a fixed formula that sets its value to the value of the parent entity. Additionally, an arrow can be added to the visual representation from the parent entity to the child entity to show that it is a clone.

Once the influence diagram has been generated and includes the entities representative of the various data and operations in the spreadsheet, then it is necessary to detect changes in the spreadsheet or in the equivalent visual representation, as represented by box 132. If a change is made to the spreadsheet or the visual representation, the spreadsheet or visual representation is automatically updated to maintain functional equivalence between the spreadsheet and the visual representation, as indicated by box 134. In this step, graphic layout techniques can be applied to update the positions of these entities in the visual representation. Various techniques can be employed to affect the change in the influence diagram as changes in the spreadsheet are detected. If an entity is added to the visual representation, it is associated to a range of cells in the spreadsheet. The steps represented at boxes 132 and 134 are continually performed as changes are detected in the spreadsheet or influence diagram.

If an entity is deleted from the influence diagram, the corresponding cells in the spreadsheet are blanked. Further, all of the arrows connected to the deleted entity are cleared. If the entity has clones, then all of the clones of the entity are deleted. If the formula of an entity is modified, then it is converted to one or more equivalent spread sheet-compatible formats (e.g., a macro routine), and the formulas of the corresponding range of cells are updated in the spreadsheet. If the value of an entity is modified, then the value of the corresponding cells in the spreadsheet is updated and all affected entity appearances in the influence diagram are updated. If the number of values associated with an entity is modified, then the formula and metric of the entity and any entities depending on the entity are modified accordingly. The entity is associated to a range containing a number of cells equivalent to its new number of values. Then, all affected entity appearances in the influence diagram are updated.

The discussion above with reference to a functional visualization of a spreadsheet is based on the situation where the spreadsheet already exists. If no spreadsheet initially exists, but an influence diagram does exist, then the procedure is applied in a reverse manner. In this situation, the process includes beginning with an empty spreadsheet and a corresponding new blank visual representation. For each entity in the existing visual representation, an identical entity is added to the new visual representation. Then, the steps of boxes 132 and 134 are performed to reflect changes in the spreadsheet.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A method for visualizing changes to a system model, said method comprising the steps of:

constructing an influence diagram including a plurality of data entities and calculation entities interconnected by arrows, where each data entity and calculation entity has a predetermined shape;

assigning a first set of data values to the data entities in the influence diagram;

calculating output values for the calculation entities in connection with the first set of data values;

assigning a second set of data values to the data entities in the influence diagram where the second set of data values is different than the first set of data values;

calculating output values for the calculation entities in connection with the second set of data values, and modifying the appearance of the influence diagram to show current values or a difference between the calculations based on the first set of data values and the calculations based on the second set of data values.

2. The method according to claim 1 wherein the step of constructing an influence diagram includes forming the data entities in one image and forming the calculation entities in another image.

3. The method according to claim 1 wherein the step of modifying the influence diagram includes changing the attributes of one or more of the data entities and/or the calculation entities.

4. The method according to claim 3 wherein the step of modifying the influence diagram includes making a particular entity a predetermined size to show the magnitude of the output of the entities.

5. The method according to claim 4 wherein the step of modifying the influence diagram includes making the size of the particular entity relative to the magnitude of the change of the output of the particular entity for the second set of data values as compared to the output of the particular entity for the first set of data values.

6. The method according to claim 4 wherein the step of modifying the influence diagram includes making the particular entity one color if the change of the output of the particular entity is greater for the second set of data values than for the first set of data values, and making the particular entity another color if the change of the output of the particular entity is less for the second set of data values than for the first set of data values.

7. The method according to claim 1 wherein the step of modifying the influence diagram includes changing the shape of a particular calculation entity if the output of the particular calculation entity is different for the second set of data values than for the first set of data values.

8. The method according to claim 1 wherein the step of modifying the influence diagram includes changing the appearance of the arrows connecting the entities.

9. The method according to claim 8 wherein the step of modifying the influence diagram includes making an arrow wider at a head of the arrow in proportion to the change in an output of a particular calculation entity.

10. The method according to claim 1 further comprising the step of calculating an aggregate value for each of a plurality of values associated with a data entity.

11. The method according to claim 1 further comprising the steps of repeating the steps of assigning data values to the data entities for more than two sets of data values, and repeatedly modifying the influence diagram to generate a sequence of modified influence diagrams.

12. The method according to claim 11 further comprising the step of displaying the sequence of modified influence diagrams to generate an animation of a result.

13. A method for visualizing changes to a system, said method comprising the steps of:

constructing an influence diagram including a plurality of data entities and calculation entities interconnected by arrows where the influence diagram models the operation of the system, wherein each data entity is formed to have one shape and each calculation entity is formed to have another shape;

assigning a first set of data values to the data entities in the influence diagram;

calculating output values for the calculation entities based on the first set of data values;

assigning a second set of data values to the data entities in the influence diagram;

calculating output values for the calculation entities based on the second set of data values; and changing the appearance of the influence diagram to show a difference between the data entities based on data changes from the first set of data values to the second set of data values and between the calculation entities based on calculations changes from the first set of data values to the second set of data values, wherein the step of changing the appearance of the influence diagram includes making the size of a particular entity relative to the magnitude of the change of the particular entity for the second set of data values as compared to the first set of data values, and making a particular entity a first color if the change of the particular calculation entity is greater for the second set of data values than for the first set of data values and making the particular calculation entity a second color if the change of the particular entity is less for the second set of data values than for the first set of data values.

14. The method according to claim 13 wherein the step of changing the influence diagram includes changing the shape of a particular calculation entity if the output of the particular calculation entity is different for the second set of data values than for the first set of data values.

15. The method according to claim 13 wherein the step of modifying the influence diagram includes changing the appearance of the arrows connecting the entities.

16. The method according to claim 15 wherein the step of modifying the influence diagram includes making an arrow wider at a head of the arrow in proportion to the change in an output of a particular calculation entity.

17. The method according to claim 13 further comprising the step of calculating an aggregate value for each of a plurality of values associated with a data entity.

18. The method according to claim 13 further comprising the steps of repeating the steps of assigning data values to the data entities for more than two sets of data values, and repeatedly modifying the influence diagram to generate a sequence of modified influence diagrams.

19. The method according to claim 18 further comprising the step of displaying the sequence of modified influence diagrams to generate an animation of a result.

20. A system for visualizing changes to a system model, said system comprising:

means for constructing an influence diagram including a plurality of data entities and calculation entities interconnected by arrows, wherein said means for constructing includes making each data entity and each calculation entity a predetermined shape;

means for assigning a first set of data values to the data entities in the influence diagram;

means for calculating output values of the calculation entities in connection with the first set of data values;

means for assigning a second set of data values to the data entities in the influence diagram;

means for calculating output values for the calculation entities in connection with the second set of data values; and means for modifying the appearance of the influence diagram to show a difference between the calculations based on the first set of data values and the calculations based on the second set of data values.

21. The system according to claim 20 wherein the means for constructing an influence diagram includes means for forming the data entities in one image and forming the calculation entities in another image.

22. The system according to claim 20 wherein the means for modifying includes means for making a particular entity a predetermined size to show the magnitude of the output of the entity.

23. The system according to claim 22 wherein the means for modifying includes means for making the size of the particular entity relative to the magnitude of the change of the output of the particular entity for the second set of data values as compared to the output of the particular entity for the first set of data values.

24. The system according to claim 22 wherein the means for modifying includes means for making the particular entity one color if the change of the output of the particular entity is greater for the second set of data values than for the first set of data values, and for making the particular entity another color if the change of the output of the particular entity is less than the second set of values than for the first set of data values.

25. The system according to claim 20 wherein the means for modifying includes means for changing the shape of a particular calculation entity if the output of the particular calculation entity is different for the second set of data values than for the first set of data values.

26. The system according to claim 20 wherein the means for modifying includes means for changing the appearance of the arrows connecting the entities.

27. The system according to claim 20 further comprising means for calculating an aggregate value for each of a plurality of values associated with a data entity.

28. The method according to claim 20 wherein the means for assigning data values repeatedly assigns data values to the data entities for more than two sets of data values, and the means for modifying includes repeatedly modifying the influence diagram to generate a sequence of modified influence diagrams.

29. The method according to claim 28 further comprising means for displaying a sequence of modified influence diagrams to generate an animation of a result.

* * * * *